(12) United States Patent
Marchthaler et al.

(10) Patent No.: US 7,161,474 B2
(45) Date of Patent: Jan. 9, 2007

(54) DEVICE FOR CLASSIFYING THE SEAT OCCUPANCY IN A MOTOR VEHICLE

(75) Inventors: Reiner Marchthaler, Gingen (DE); Thomas Lich, Schwaikheim (DE); Frank Mack, Stuttgart (DE); Michael Meyer, Altdorf (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 10/479,504

(22) PCT Filed: May 31, 2002

(86) PCT No.: PCT/DE02/02000

§ 371 (c)(1),
(2), (4) Date: Jul. 8, 2004

(87) PCT Pub. No.: WO02/098709

PCT Pub. Date: Dec. 12, 2002

(65) Prior Publication Data

US 2004/0239515 A1    Dec. 2, 2004

(30) Foreign Application Priority Data

Jun. 2, 2001   (DE) ............................... 101 27 058

(51) Int. Cl.
*B60Q 1/00*   (2006.01)

(52) U.S. Cl. .................. 340/438; 340/425.5; 340/666; 340/667; 340/668; 340/457.1; 280/735; 280/801.1

(58) Field of Classification Search ................ 340/438, 340/439, 436, 666, 667, 668, 457.1, 425.5; 701/45, 405; 280/735, 733, 734, 730.2, 801.1, 280/806
See application file for complete search history.

(56) References Cited

U.S. PATENT DOCUMENTS

| 3,895,346 | A | * | 7/1975 | Assfour et al. | ............. 180/270 |
| 5,394,955 | A |   | 3/1995 | Howard |   |
| 5,984,350 | A | * | 11/1999 | Hagan et al. | ............... 280/735 |
| 6,079,744 | A | * | 6/2000 | Husby et al. | ............ 280/801.1 |
| 6,382,667 | B1 | * | 5/2002 | Aoki | ........................ 280/735 |

FOREIGN PATENT DOCUMENTS

DE       100 49 528      4/2001

* cited by examiner

*Primary Examiner*—Hung Nguyen
(74) *Attorney, Agent, or Firm*—Kenyon & Kenyon LLP

(57) ABSTRACT

A device for classifying the seat occupancy in a motor vehicle by which the accuracy in the detection of child seats may be increased is provided. The seats of the motor vehicle are each equipped with a safety belt, a belt buckle for the safety belt and a belt-buckle switch. The device includes at least one belt-force sensor for at least one safety belt. According to the present invention, the belt-force sensor and the belt-buckle switch assigned to the respective safety belt are interconnected in such a way that the output signals of the belt-force sensor and the belt-buckle switch are combined into one belt-buckle output signal.

5 Claims, 1 Drawing Sheet

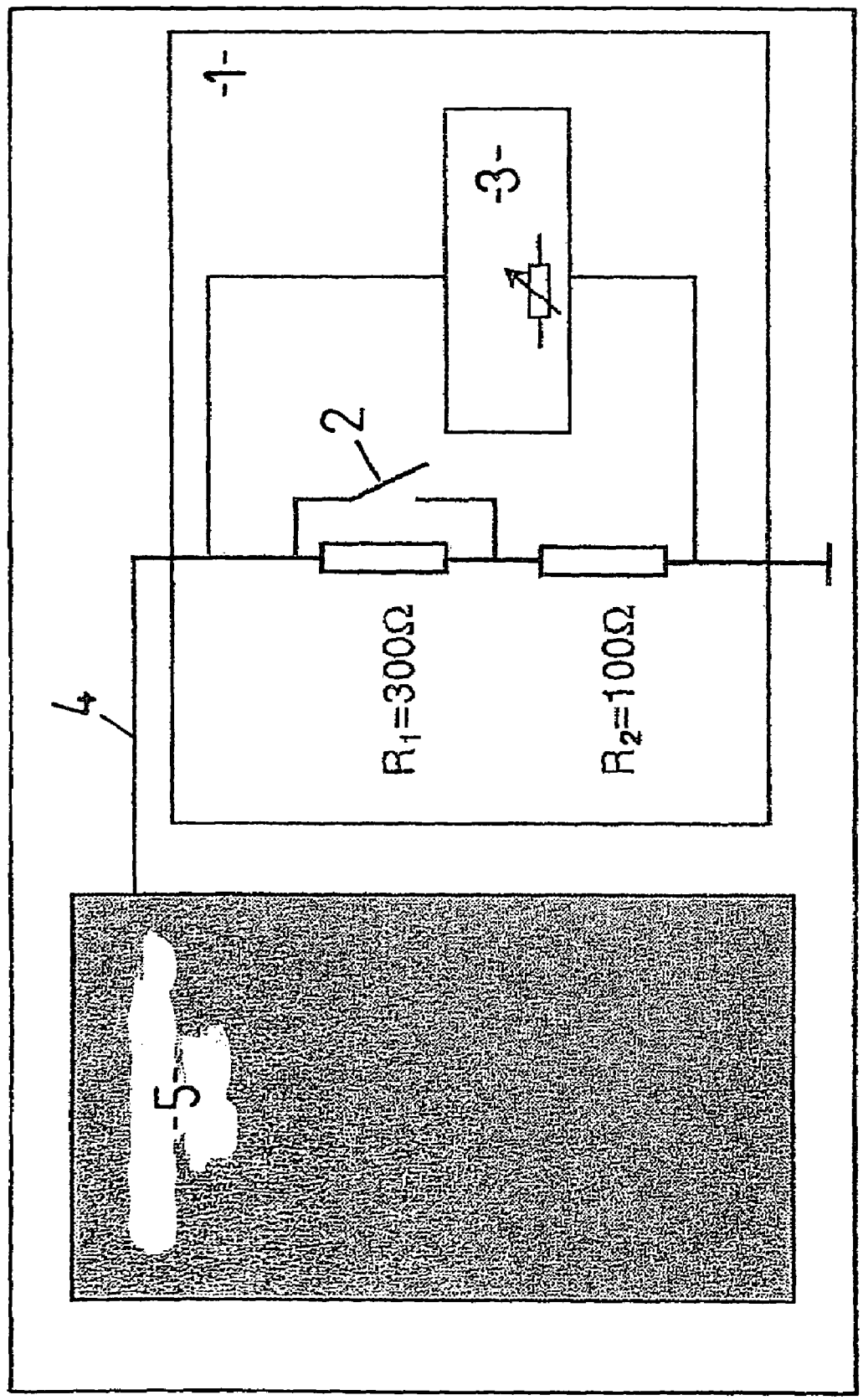

DEVICE FOR CLASSIFYING THE SEAT OCCUPANCY IN A MOTOR VEHICLE

FIELD OF THE INVENTION

The present invention is directed to a device for classifying seat occupancy in a motor vehicle having seats that are each equipped with a safety belt, a belt buckle for the safety belt and a belt-buckle switch. The device includes at least one belt-force sensor for the safety belts of the motor vehicle.

BACKGROUND INFORMATION

The triggering of restraining devices in a motor vehicle usually occurs as a function of various parameters such as the severity of the impact and the position and weight of the passengers. In this context, it is useful to take the respective belt force into consideration as well, which is explained in greater detail in the following on the basis of an example.

For the triggering of a multi-stage airbag and for the triggering of belt tighteners, data may be acquired regarding the profile of the individual passengers from which conclusions as to their weight may be drawn. In practice, occupant-classification systems having a force-sensor array installed in the seat can be used for this purpose. The force sensors may be foil strain gauges for direct weight measurement. However, the force-sensor array may also be implemented in the form of a sensor mat having pressure-sensitive sensor cells, which are arranged in a matrix and which may be activated individually, so that the pressure distribution in the seat may be detected in the form of a value matrix. The heavier a person, the more heavily the seat material is compressed and the higher the number of activated sensor cells. Of course, the pressure value detected by a sensor cell can also depend on the respective pressurization. In evaluating the pressure data detected by the individual sensor cells of the sensor mat, the number of the activated sensor cells is therefore taken into consideration in addition to the individual pressure values. A control device, installed in the seat, carries out the evaluation. The result of the evaluation is transmitted to the air bag control device, so that the individual seat occupancy may be taken into consideration in the triggering of the restraining device. This method is largely independent of external conditions such as cold or wear.

However, conventional occupant-classification systems regularly reach their limits in the detection of child seats, in particular of strapped-in child seats, if the applied belt force is not taken into consideration.

A child seat may indeed be detected on the basis of its seat profile, which does not resemble that of an adult. However, if a child seat is strapped in very tightly, using a belt force of 150 N, for example, it is pressed into the seat at a corresponding force. In the process, the seat profile of the child seat is distorted; the child seat appears heavier than it actually is. This means that the evaluation result of an occupant-classification system may be rendered inaccurate by the application of a corresponding belt force, to such an extent that a child seat is classified as an adult and the passenger airbag is erroneously released.

However, when it is a person that is strapped in, a belt force of more than 30 N cannot really be applied over a long period of time since the belt normally yields in these cases. Furthermore, such a high belt force would be so uncomfortable to the occupant that it would not be maintained for any greater length of time. Therefore, when the belt force exceeds a certain threshold value it can be assumed with a high degree of certainty that it is not a person that is strapped in but a child seat or some other object. On the basis of the data of the applied belt force, it is thus already possible to implement an occupancy detection to a certain degree. For this reason, conventional occupant-classification systems often include a belt-force sensor in addition to a force-sensor array.

SUMMARY

The present invention provides a device for passenger classification in a motor vehicle, by which the accuracy in the detection of child seats may be increased, and for which already-present signal lines may be utilized for the output signal of the belt-force sensor.

According to the present invention, this is possible because the belt-force sensor and the belt-buckle switch assigned to the respective safety belt are interconnected in such a way that the output signals of the belt-force sensor and the belt-buckle switch are combined into one belt-buckle output signal.

The belt-buckle switch is used to detect the belt-fastening state, i.e., to detect whether a vehicle occupant is strapped in or not. Accordingly, the belt-buckle switch may be in only two different states, and the output signal of the belt-buckle switch may assume only two different values. The output signal of the belt-buckle switch is supplied to the airbag control device so that the belt-fastening state may be taken into account in the triggering of the restraining means. The output signal of the belt-force sensor is also supplied to the airbag control device when it is used, for example, in the triggering of the restraining device for occupant classification. According to the present invention, the output signals of the belt-force sensor and the belt-buckle switch may be combined in an advantageous manner, without causing a deleterious loss in data. The two output signals are fed to the airbag control device. Secondly, the two output signals are coupled to one another insofar as the belt-force sensor is only able to provide useful output signals if the corresponding safety belt has been inserted, i.e., when the buckle switch is in the corresponding state. It is thus possible to use the same signal lines to the airbag control device and, if applicable, the same evaluation circuit as well for the output signals of the belt-force sensor and the belt-buckle switch.

There are a number of embodiments for implementing the device according to the present invention, provided that the belt-buckle output signal enables unambiguous conclusions as to the output signal of the belt-force sensor.

In an example embodiment of the device according to the present invention, the output signal of the belt-buckle switch is resistance-coded, since this makes it possible to detect short circuits and breaks in a reliable manner as well. The output signal of the belt-force sensor is also resistance-coded.

In the occupant classification, the evaluation of the detected belt force is usually implemented in the form of a threshold analysis. If the detected belt force is above a threshold value of 30 N, for example, it may be assumed that the corresponding vehicle seat is occupied by a child seat or some other object. In practice, the use of a plurality of threshold values that define a so-called gray area for the detected belt force has proven advantageous. In these cases, an unambiguous decision can be made as to whether the vehicle seat is occupied by a person or a child seat, solely on the basis of the belt force. It is then useful to include additional parameters, which improves the occupant classification overall. In view of the use of the belt-force sensor within the framework of occupant classification, it is therefore advantageous if the output signal of the belt-force sensor may assume only specific resistance values, depending on whether the belt force is above or below at least one threshold value, so that the belt buckle output signal may likewise assume only specific resistance values, depending on whether the belt buckle is open or locked. In this case, the threshold-value analysis takes place inside the belt-force sensor.

The output signals of the belt-force sensor and the belt-buckle switch may easily be combined, as far as circuit design is concerned, by switching the belt-force sensor and the belt-buckle switch in parallel. In this context, the belt-force sensor and the belt-buckle switch can be integrated in the belt buckle.

BRIEF DESCRIPTION OF THE DRAWING

FIG. 1 illustrates an example embodiment of a device according to the present invention for classifying the seat occupancy in a motor vehicle, showing interconnection between a belt-force sensor with a belt-buckle switch.

DETAILED DESCRIPTION

The device for classifying the seat occupation in a motor vehicle shown at least in part in FIG. 1 is configured for a motor vehicle having seats which each include a safety belt, a belt buckle 1 for the safety belt and a belt-buckle switch 2. The device includes at least one belt-force sensor 3 for each safety belt. In certain instances, the belt-force sensors may be provided solely for the safety belts of the driver seat and the passenger seat.

According to the present invention, belt-force sensor 3 and belt-buckle switch 2 assigned to the corresponding safety belt are interconnected such that the output signals of belt-force sensor 3 and of belt-buckle switch 2 are combined into one belt-buckle output signal, which in the exemplary embodiment depicted is forwarded to an airbag triggering device 5 via a signal line 4.

Belt-force sensor 3 and belt-buckle switch 2 are integrated in belt buckle 1 in this case, which is advantageous for a compact design.

Belt-buckle switches are used to detect the belt-fastening state of an occupant and in practice are often implemented with resistance coding so as to reliably detect short circuits and power interruptions as well. Belt-buckle switch 2 in the exemplary embodiment depicted is likewise resistance coded. For this purpose, belt buckle 1 includes two resistors connected in series: $R_1=300\ \Omega$ and $R_2=100\ \Omega$. Belt-buckle switch 2 is connected in parallel to $R_1$, so that resistor $R_1$ is bridged when belt-buckle switch 2 is closed when the safety belt is inserted. In order to be able to combine the output signals of belt-force sensor 3 and of belt-buckle switch 2, the output signal of belt-force sensor 3 is also resistance-coded.

Belt-force sensor 3 is connected in parallel to the series connection of resistors $R_1$ and $R_2$ and thus also connected in parallel to belt-buckle switch 2.

Belt-force sensor 3 may assume only two different resistance values in the exemplary embodiment depicted, namely either an open circuit value when the belt force is below a predefined threshold value, or $100\ \Omega$ when the belt force is above this threshold value. Correspondingly, the belt-buckle output signal may likewise assume only specific resistance values, depending on whether belt buckle 1 is open or locked.

The following decision table results for belt-buckle output signal GS-AS for an example embodiment of the device according to the present invention, shown in FIG. 1:

| | GS-AS |
|---|---|
| $<50\ \Omega$ | Fault |
| $50\ \Omega$ | Safety belt inserted and belt force > threshold value |
| $50\ \Omega < \ldots > 100\ \Omega$ | Fault |
| $100\ \Omega$ | Safety belt inserted and belt force < threshold value |
| $100\ \Omega < \ldots > 400\ \Omega$ | Fault |
| $400\ \Omega$ | safety belt not inserted |
| $>400\ \Omega$ | Fault |

What is claimed is:

1. A device for classifying seat occupancy in a motor vehicle having seats each equipped with a safety belt, a belt buckle for the safety belt and a belt-buckle switch, the device comprising:

at least one belt-force sensor for at least one of the safety belts, the at least one belt-force sensor and the belt-buckle switch of the corresponding safety belt being interconnected such that output signals of the at least one belt-force sensor and the belt-buckle switch are combined into one belt-buckle output signal, wherein the belt-buckle output signal has a characteristic value caused by the interconnection of the at least one belt-force sensor and the belt-buckle switch.

2. The device as recited in claim 1, wherein the output signals of the at least one belt-force sensor and the belt-buckle switch are both resistance-coded.

3. The device as recited in claim 2, wherein the at least one belt-force sensor is configured so that the output signal of the at least one belt-force sensor exhibits specific resistance values based on whether a belt force is one of above and below at least one threshold value, and wherein the belt-buckle output signal exhibits specific resistance values based on whether the belt buckle is one of open and locked.

4. The device as recited in claim 1, wherein the at least one belt-force sensor and the belt-buckle switch are connected in parallel.

5. The device as recited in claims 1, wherein the at least one belt-force sensor and the belt-buckle switch are integrated in the belt buckle.

* * * * *